UNITED STATES PATENT OFFICE.

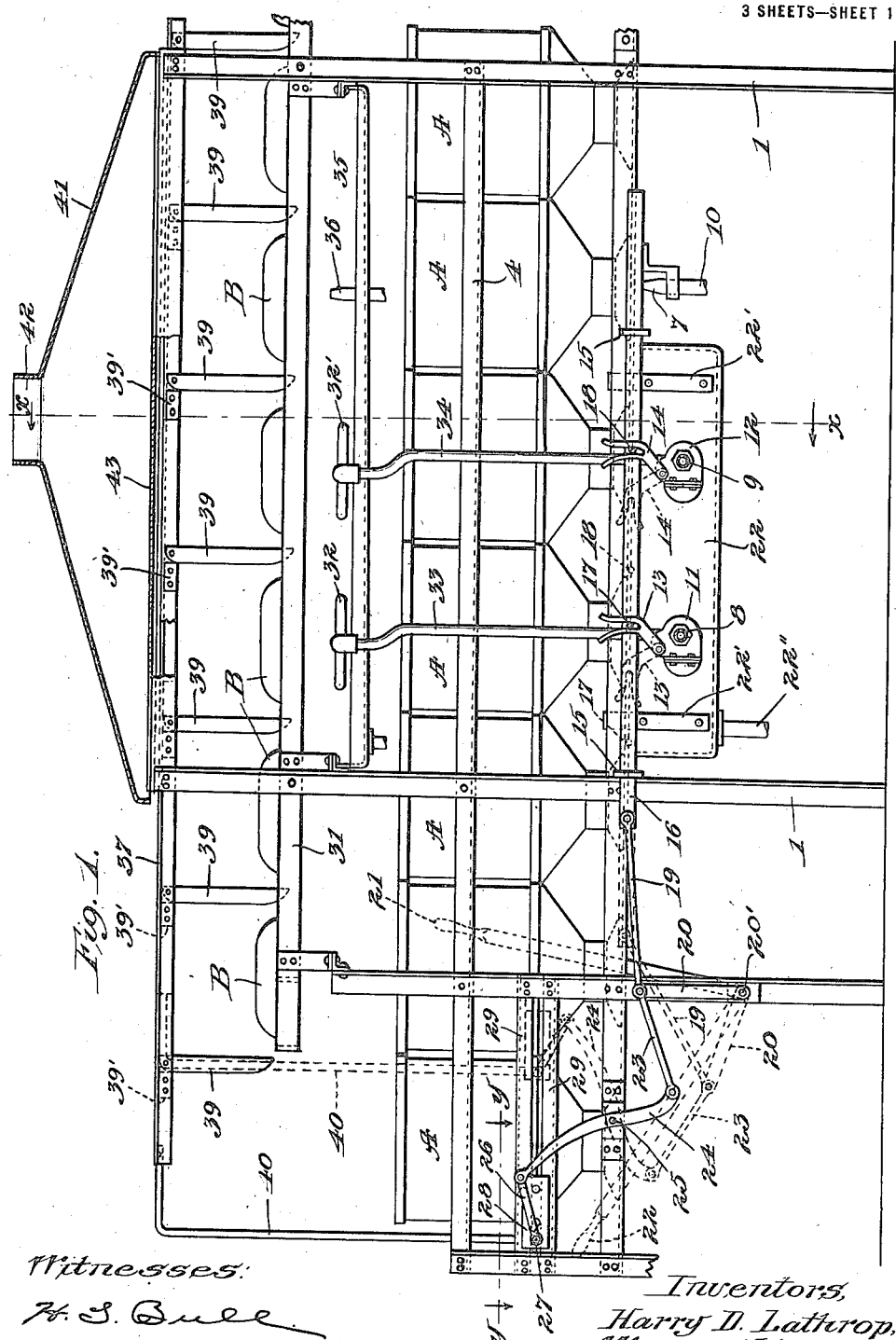

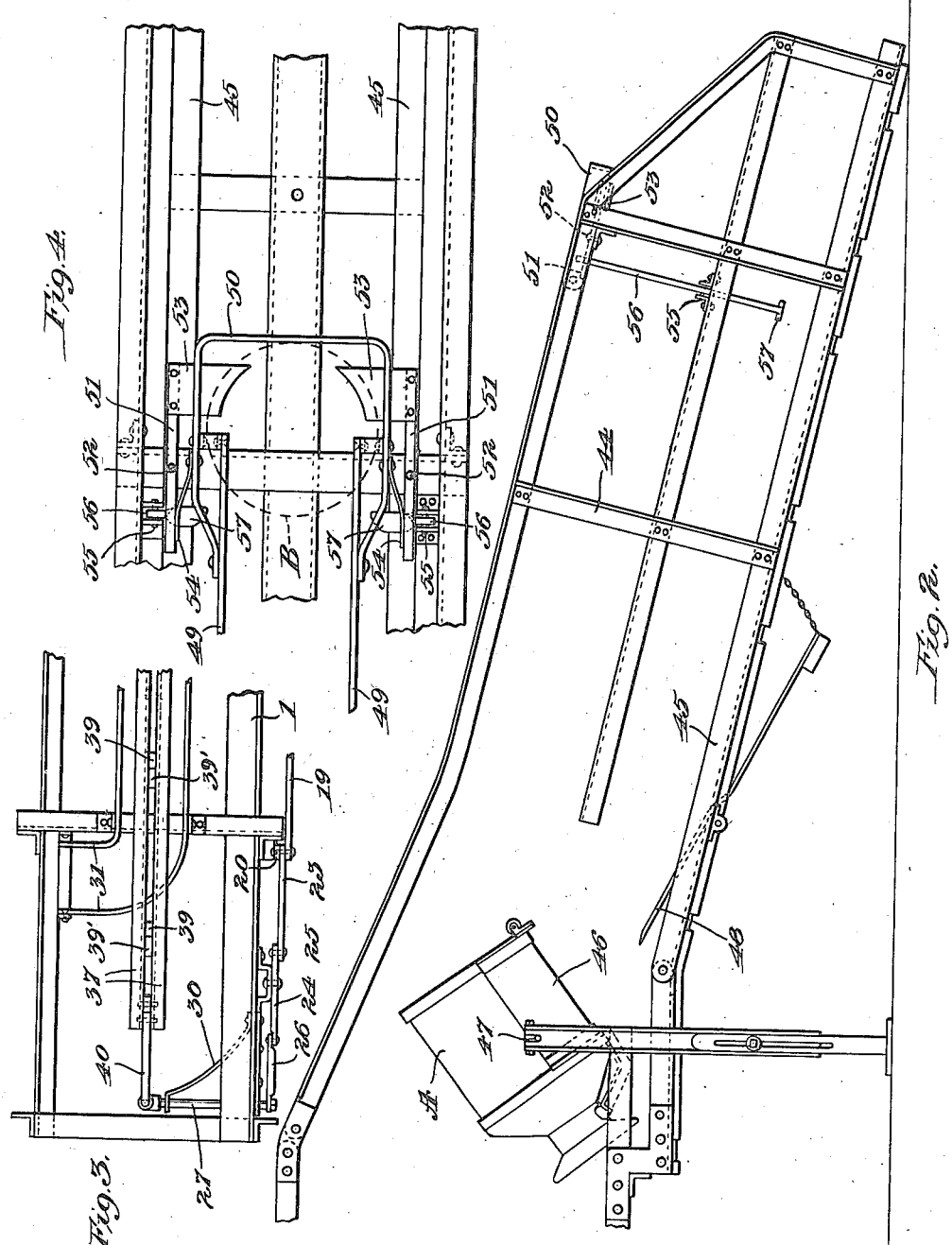

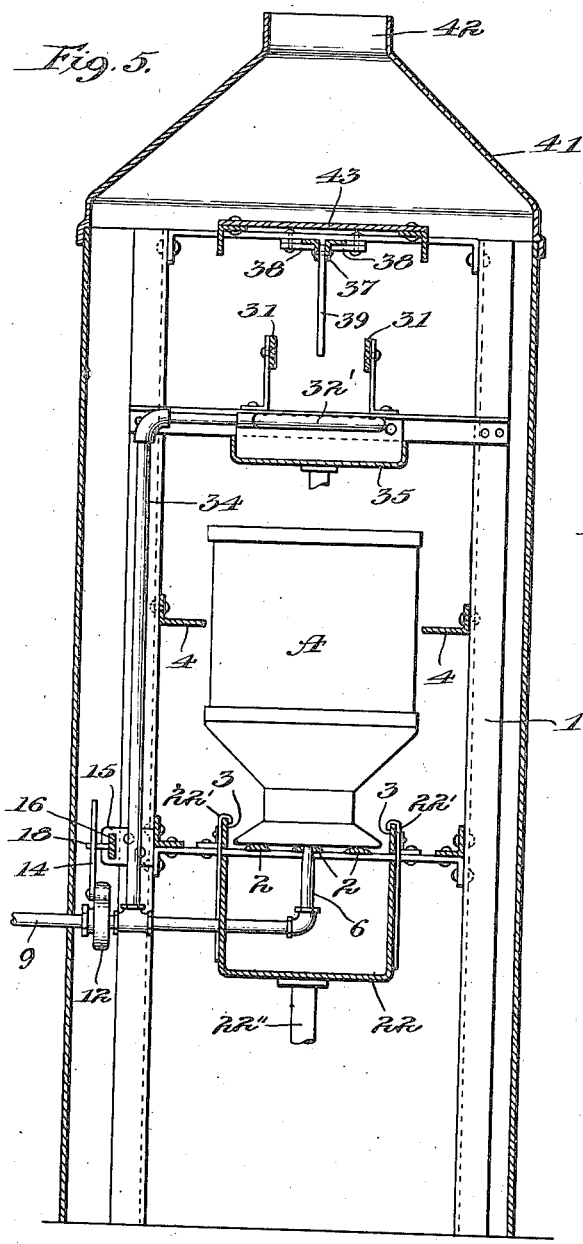

HARRY D. LATHROP AND WALTER H. PAULSON, OF CHICAGO, ILLINOIS.

MILK-CAN-WASHING MACHINE.

1,249,129. Specification of Letters Patent. Patented Dec. 4, 1917.

Application filed September 24, 1915. Serial No. 52,426.

*To all whom it may concern:*

Be it known that we, HARRY D. LATHROP and WALTER H. PAULSON, citizens of the United States, and residents of the city of Chicago, county of Cook, and State of Illinois, have invented certain new and useful Improvements in Milk-Can-Washing Machines, of which the following is a specification.

Our invention relates to improvements in milk can washing machines, the present application being in part a division of our pending application, Serial No. 18,235, filed March 31, 1915 for milk can washing machines.

The object of this invention is the production of a milk can washing machine which will be complete in every detail and through the medium of which milk cans or covers therefor may be thoroughly and expeditiously cleaned.

A further object is the production of a machine of the character mentioned which may be readily and easily operated and which will be of durable and economical construction.

The invention consists in the combinations and arrangements of parts hereinafter described and claimed.

The invention will be best understood by reference to the accompanying drawings forming a part of this specification, and in which, Figure 1 is a rear elevation of one end of a machine embodying the invention, parts being broken away and shown in section to better illustrate the construction, Fig. 2 is a side elevation of the other end of the machine, Fig. 3 is a top plan view of the entrance end of the machine that is the left hand portion of the construction shown in Fig. 1, Fig. 4 is an enlarged detail plan view of the opposite end portion of the machine, showing the mechanism for arresting the movement of the milk can covers and automatically releasing the same upon the passage of a milk can, Fig. 5 is an enlarged section taken on substantially line *x—x* of Fig. 1, Fig. 6 is an enlarged detail section taken on line *y—y* of Fig. 1, and Fig. 7 is a detail section taken on line *z—z* of Fig. 6.

The preferred form of construction, as illustrated in the drawings, comprises a supporting frame 1 in the lower portion of which are provided spaced longitudinally extending parallel guides 2 adapted to slidably support the milk cans A in the passage of the same through the machine, as clearly shown in Fig. 5. At the sides of guides 2 are provided rails 3 which serve to hold the milk cans in position upon said guides. Guide bars 4 are also provided for coöperation with the upper end portions of the cans in the travel thereof along the guides 2, to prevent lateral rocking or tipping of the cans. The milk cans are adapted to be arranged upon the guides 2 at the left hand end of the machine, as shown in Fig. 1, the member 4 at the front side of the machine at this end being omitted in order to permit of the placing of the cans upon said guides.

Spaced along the guides 2 medially thereof are a water nozzle, a steam nozzle 6 and a hot air nozzle 7, the upper ends of which project through the central one of said guide bars, as clearly shown in Fig. 5. Communicating with the water nozzle is a water supply pipe 8, communicating with the nozzle 6 is a steam supply pipe 9, and communicating with the nozzle 7 is a hot air supply pipe 10. Interposed in the pipes 8 and 9 are gate valves 11 and 12, respectively, which are controlled by rocker arms 13 and 14, as clearly shown in Fig. 1.

Slidably mounted in laterally projecting guides 15 is a bar 16 provided with laterally projecting pins 17 and 18 adapted for engagement in slots provided as shown in the outer ends of arms 13 and 14. The arrangement is such, as will be seen that, upon reciprocation of the bar 16, the arms 13 and 14 will be rocked to effect closing and opening of the valves with which the same coöperate.

One end of bar 16 is connected by means of a link 19 with a rocker arm 20 fixed at its lower end to a transversely extending rocker shaft 20', the opposite end of the latter being connected with the lower end of a hand operable lever 21 which is provided at the front side of the machine. With this arrangement, it will be seen that bar 16 may be reciprocated to actuate the valves 11 and 12 through oscillation of lever 21. Upon opening of the valves 11 and 12, it is of course apparent that the water and steam discharged through the nozzles 5 and 6 which enters the cans positioned thereover will serve to clean the latter, the arrangement being such, as hereinafter set forth, that in the operation of the machine the interior of each can will be successively subjected to a bath of water, steam and hot air in the advance of the can through the machine. In order to accommodate the drippings from the cans when subjected to water and steam baths, a pan 22 is provided which is suspended by straps 22' from the guide rails 3, as shown in Fig. 5. A drain pipe 22" leads from the pan 22.

The upper end of rocker arm 20 is also connected by means of a link 23 with the lower end of a lever 24 fulcrumed intermediate its ends as at 25 to the frame work 1. The upper end of lever 24 is connected by means of a link 26 with one end of a transversely extending bar 27 which is fixed in a carriage 28 mounted for reciprocation between guide rails 29, as clearly shown in Figs. 1, 6 and 7. An angularly disposed brace strap 30 coöperates with the inner end of bar 27 for reinforcement. The arrangement is such, as will be seen that an operative connection is established between the lever 21 and the bar 27 so that, upon oscillation of said lever, the bar 27 will be reciprocated. Said bar is positioned for engagement with the milk cans A positioned upon the guides 2, the inner end of said bar being positioned centrally of said guides so that upon inward movement of said bar, the same will engage with the endmost milk can and cause the same to be pushed forward on the guides 2, such movement of this can effecting, of course, the advance of the entire line of cans which are positioned side by side upon said guides, as clearly shown in Fig. 1.

Provided in the upper end of frame 1 are parallel guide bars 31 adapted to support the milk can covers B, as clearly shown in Fig. 1. The ends of the guide bars 31 at the entrance end of the machine are bent laterally, as clearly shown in Fig. 3, in order to permit of ready placing of the covers upon said bars.

Arranged under the guide bars 31 are nozzles 32 and 32' in the form of hollow flat circular members, the upper walls of which are perforated to permit of the escape of fluid therethrough. Said nozzles are connected by means of pipes 33 and 34 with the supply pipes 8 and 9 respectively, the arrangement being such that the nozzles 32 and 32' will be controlled by the valves 11 and 12 in precisely the same manner as the water and steam nozzles which coöperate with the cans are controlled thereby. This being so in the advance of the can covers through the machine, each will be subjected to a bath of water, and then of steam in order to effect thorough cleaning and sterilization thereof. Below the nozzles 32 and 32' is provided a drip pan 35 which serves an obvious purpose. A nozzle 36 is also provided spaced from the nozzles 32' which is adapted to be connected with a source of hot air supply for effecting drying of the covers after the same have been subjected to the steam bath. No valves are provided for the control of the hot air nozzles 7 and 36 inasmuch as the same, during operation of the machine, will be continually discharging.

Arranged over the guide members 31 is an elongated reciprocating element 37 formed of two angle irons placed side by side with their outwardly extending flanges slidably engaging with plates 38 secured to the frame work 1, as clearly shown in Fig. 5. Depending at intervals from the element 37 are pivoted fingers 39, said fingers being free for oscillation toward the right but limited in their movement in the opposite direction by stops 39', as shown in Fig. 1. The arrangement is such that, upon reciprocation of the element 37, the fingers 39 will engage with the covers B and cause advance of the same upon guide bars 31. The free movement of the fingers 39 in the direction mentioned, permits of rearward movement of the element 37, without said fingers carrying the covers rearwardly therewith. The rearward end of element 37 is connected by means of a bar 40 with the bar 27. With this arrangement, it will be seen that an operative connection is established with the operating lever 21, so that upon tilting of said lever in one direction, the milk cans and covers will be advanced through the machine and the water and steam valves 11 and 12 opened as said covers and cans approach the terminal of the position to which the same are advanced. Upon return rocking of the lever 21, the can engaging bar 27 and the cover advancing element 37 will be simultaneously retracted and the valves 11 and 12 closed.

A housing 41 is provided inclosing the portion of the frame work in which the water and steam nozzles are located, a discharge opening 42 for the escaping steam being provided at the upper end of said housing. A plate 43 is provided directly over the cover guides 31 to prevent dripping of water of condensation from the top wall of the housing 41 onto the covers positioned below.

The discharge end of the machine is inclined, being constituted by a framework 44 in the lower end of which are provided guide bars 45 for engagement with the cans, as clearly shown in Fig. 2. At the adjacent ends of the guide bars 2 is provided a can reversing element 46 fulcrumed at 47, the function of which is to automatically reverse the cans in the dropping of the latter from engagement with the guides 2. The reversing mechanism will not be described here inasmuch as the same forms the subject matter of our pending application, above referred to, it being enough to say that said reversing mechanism simply reverses each can delivered thereto, automatically depositing the same upright upon the guide bars 45. A cushioning element 48 is provided to prevent tipping over of the cans in the deposit of the same upon the inclined guides 45. After the deposit of the cans upon guide bars 45, the same slide down said guides by gravity, as will be readily understood.

The cover guide bars 31 are connected with inclined guide bars 49 down which the covers are adapted to slide by gravity in the same manner as the milk cans above mentioned. At the lower ends of cover guide bars 49, as clearly shown in Fig. 4, is provided a substantially U-shaped strap 50 rigidly secured in position which is adapted to arrest the movement of a cover along guide bars 49. Arranged at the sides of member 50 are arms 51 pivotally secured at 52. Corresponding ends of the arms 51 are provided with inwardly projecting plates 53 adapted, when said plates are at their inward terminals of movement, to serve as rests for the forward end of the can cover engaging against the member 50. Leaf springs 54 coöperate with the arms 51 to normally hold the latter in operative position, that is with the plates 53 at their inner terminals of movement, as shown. Pivoted intermediate their ends as at 55, are levers 56 the upper ends of which engage with the arms 51 so that upon outward rocking of the lower ends of lever 56, the arms 51 will be rocked to effect retraction of plates 53. The lower ends of levers 56 are bent inwardly as at 57 and rounded for engagement with the milk cans traveling along guides 45. With this arrangement, it will be seen that in the passage of a can along guides 45, as the same passes the levers 56, the latter will be actuated to effect retraction of the plates 53, effecting release of the forward end of the can cover engaging against the stop member 50 so as to permit of dropping of the cover by gravity to position upon the upper end of the passing can. Thus, with this arrangement, each can, as the same is about to be discharged, will be automatically provided with a cover.

In using the machine, the milk cans to be cleaned will be delivered to the attendant in upright position. The first step taken by the attendant is to remove the cover of each can placing the same upon the cover guides 31. Each can is then inverted by the attendant in order to empty any milk contained therein, into the reservoir which is provided for the purpose, each can after being thus emptied being placed upon the guides 2. After each can and its corresponding cover have been thus placed in the machine, the lever 21 is operated to advance the same through the machine. As the cans and covers pass along the guides 2 and 31, the same will each be subjected to a bath of water, steam and hot air, thus effecting a thorough cleansing, sterilizing and drying of each. When the first cover reaches the end of the guides 31, the succeeding operation of the machine, that is of the lever 21, will cause said cover to be pushed from said guides onto the guides 49 down which the cover will slide by gravity to position against the stop 50. At the same time, the insertion of the succeeding can and operation of lever 21 will cause the first can at the other end of the machine to be discharged from the guides 2 and deposited into engagement with the reversing frame 46. As the can passes down the guides 45 after being reversed, the cover which has previously reached its position in engagement with the stop 50, will be released by the can, and deposited upon the upper end thereof, as before described. It will thus be seen that operation of the machine is exceedingly simple requiring simply the placing of the covers and cans upon the corresponding guides and actuation of the lever 21, such action of said lever effecting simultaneously the advance of the covers and cans in the machine and the actuation of the cleansing fluid controlling valves.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having described our invention what we claim as new and desire to secure by Letters Patent is:

1. A machine of the class described comprising a can guide upon which the cans are adapted to be mounted and moved in inverted position; a guide for the can covers; means for cleaning the cans and covers in the passage of the same along said guides; means for individually and successively reversing the cans after the cleaning of the same; a discharge guide along which the cans are adapted to move after the same have been reversed; and means operable by the passage of a can along said discharge guide for individually and sucessively applying the covers to the cans, substantially as described.

2. A machine of the class described comprising a can guide upon which the cans are adapted to be mounted and moved; a guide for the can covers; means for cleaning the cans and covers in the passage of the same along said guides; and pivotally mounted means operable by engagement therewith of a can for releasing a cover and depositing the same upon the upper end of the can, substantially as described.

3. A machine of the class described comprising a can guide upon which the cans are adapted to be mounted and moved; a guide for the can covers; means for cleaning the cans and covers in the passage of the same along said guides; and pivotally mounted means for automatically successively discharging the covers from said guide onto the upper ends of the cans in the passage of the latter along said can guide, substantially as described.

4. A machine of the class described comprising a can guide upon which the cans are adapted to be mounted and moved; a guide for the can covers; means for cleaning the cans and covers in the passage of the same along said guides; and means operable by the passage of the cans along said can guide for successively discharging the covers from said cover guide onto the upper ends of the cans, substantially as described.

5. A machine of the class described comprising a can guide upon which the cans are adapted to be mounted and moved; a guide for the can covers; means for cleaning the cans and covers in the passage of the same along said guides; means for successively discharging the covers from said cover guide; and cam surfaces adapted for engagement by the cans passing the same for actuating said cover discharging means to deposit a cover onto the upper end of the can, substantially as described.

6. A machine of the class described comprising a can guide upon which the cans are adapted to be mounted and moved in inverted position; a guide for the can covers; means for cleaning the cans and covers in the passage of the same along said guides, one end of said can guide being inclined whereby the cans deposited thereon will slide down the same by gravity; means for individually and successively reversing the cans after the cleaning of the same and depositing thereof onto said inclined guide portion, the corresponding end portion of said cover guide being inclined, whereby the covers in reaching said portion, will slide down the same by gravity; and means for automatically releasing a cover and depositing the same on a can as the latter passes down said inclined portion of the can guide, substantially as described.

7. A machine of the class described comprising a can guide upon which the cans are adapted to be mounted and moved in inverted position; a guide for the can covers; means for cleaning the cans and covers in the passage of the same along said guides, one end of said can guide being inclined whereby the cans deposited thereon will slide down the same by gravity; means for individually and successively reversing the cans after the cleaning of the same and depositing thereof onto said inclined guide portion, the corresponding end portion of said cover guide being inclined, whereby the covers in reaching said portion, will slide down the same by gravity; a stop at the lower end of said inclined portion of the cover guide adapted to arrest the movement of a cover thereon; and means for automatically releasing a cover after stoppage by said stop for depositing the same onto the upper end of a can as the latter passes down said inclined portion of said can guide, substantially as described.

8. A device of the class described comprising a can guide upon which the cans are adapted to be mounted and moved; a guide for the can covers upon which the covers are adapted to be mounted and moved; cleansing fluid supply pipes for supplying fluid for cleaning the cans and covers in the advance of the same along said guides; valves for controlling the flow of fluid through said pipes; a reciprocatory member for intermittently moving the cans upon said can guide; a reciprocatory member mounted in proximity to said cover guide for intermittently advancing the covers upon said cover guide; and means for simultaneously actuating said valves and said can and cover moving members, substantially as described.

In testimony whereof we have signed our names to this specification in the presence of two subscribing witnesses.

HARRY D. LATHROP.
WALTER H. PAULSON.

Witnesses:
JOSHUA R. H. POTTS,
HELEN F. LILLIS.